United States Patent
Fattal

(10) Patent No.: US 10,698,217 B2
(45) Date of Patent: Jun. 30, 2020

(54) DIFFRACTIVE BACKLIGHT DISPLAY AND SYSTEM

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 67 days.

(21) Appl. No.: 15/904,406

(22) Filed: Feb. 25, 2018

(65) Prior Publication Data

US 2018/0180793 A1 Jun. 28, 2018

Related U.S. Application Data

(63) Continuation of application No. PCT/US2016/040904, filed on Jul. 2, 2016.

(60) Provisional application No. 62/214,976, filed on Sep. 5, 2015.

(51) Int. Cl.
| | | |
|---|---|---|
| *G02B 27/01* | (2006.01) | |
| *F21V 8/00* | (2006.01) | |
| *G02C 7/04* | (2006.01) | |
| *G02B 5/18* | (2006.01) | |

(52) U.S. Cl.
CPC ....... *G02B 27/0172* (2013.01); *G02B 5/1866* (2013.01); *G02B 6/0036* (2013.01); *G02B 6/0038* (2013.01); *G02B 6/0058* (2013.01); *G02C 7/04* (2013.01); *G02B 2005/1804* (2013.01); *G02B 2027/0174* (2013.01)

(58) Field of Classification Search
CPC .......... G02B 2005/1804; G02B 6/0036; G02B 6/0038; G02B 6/0058; G02B 2027/0174; G02B 27/0172; G02B 5/1866; G02C 7/04
See application file for complete search history.

(56) References Cited

U.S. PATENT DOCUMENTS

| | | |
|---|---|---|
| 5,617,248 A | 4/1997 | Takahashi et al. |
| 9,335,548 B1 | 5/2016 | Cakmakci et al. |
| 9,552,777 B2 | 1/2017 | Travis |
| 9,557,466 B2 * | 1/2017 | Fattal .................. G02B 6/0068 |

(Continued)

FOREIGN PATENT DOCUMENTS

| | | | |
|---|---|---|---|
| JP | H0763909 A | 3/1995 | |
| JP | 2000267041 A | 9/2000 | |

(Continued)

OTHER PUBLICATIONS

International Search Report (ISR) from the International Searching Authority (ISA/KR) dated Oct. 17, 2016 (5 pages) for counterpart parent PCT Application No. PCT/US2016/040904.

(Continued)

*Primary Examiner* — Alan B Cariasco
(74) *Attorney, Agent, or Firm* — J. Michael Johnson

(57) ABSTRACT

A diffractive backlight system includes a light source and a plate light guide. A surface of the plate light guide is configured with a diffraction grating that couples light out of the plate light guide and concentrates the light into a localized region of space. The diffractive backlight system may be used with at least one light valve array to form a display that generates images for viewing in the localized region of space. The display may be incorporated in head-mounted displays in order to generate focused augmented or virtual reality images for wearers.

20 Claims, 13 Drawing Sheets

(56) References Cited

U.S. PATENT DOCUMENTS

| | | |
|---|---|---|
| 2003/0067685 A1 | 4/2003 | Niv |
| 2004/0208466 A1 | 10/2004 | Mossberg et al. |
| 2006/0227067 A1 | 10/2006 | Iwasaki |
| 2007/0242237 A1 | 10/2007 | Thomas |
| 2008/0225393 A1* | 9/2008 | Rinko .................. G02B 6/0036 359/571 |
| 2008/0310187 A1 | 12/2008 | Huang |
| 2010/0157400 A1 | 6/2010 | Dimov et al. |
| 2010/0177388 A1 | 7/2010 | Cohen et al. |
| 2011/0157667 A1 | 6/2011 | Lacoste et al. |
| 2012/0119978 A1 | 5/2012 | Border et al. |
| 2012/0162549 A1 | 6/2012 | Gao et al. |
| 2013/0258461 A1 | 10/2013 | Sato et al. |
| 2013/0286661 A1* | 10/2013 | Holman ............. G02B 26/0875 362/332 |
| 2014/0064655 A1 | 3/2014 | Nguyen et al. |
| 2014/0071539 A1 | 3/2014 | Gao |
| 2014/0104685 A1 | 4/2014 | Bohn et al. |
| 2014/0159636 A1* | 6/2014 | Yang ...................... F21S 9/037 320/101 |
| 2014/0168260 A1 | 6/2014 | O'Brien et al. |
| 2014/0268867 A1 | 9/2014 | Fiorentino et al. |
| 2014/0300840 A1 | 10/2014 | Fattal et al. |
| 2015/0036068 A1 | 2/2015 | Fattal et al. |
| 2015/0234205 A1 | 8/2015 | Schowengerdt |
| 2016/0091737 A1 | 3/2016 | Kim et al. |
| 2016/0209656 A1 | 7/2016 | Urey |
| 2016/0299354 A1 | 10/2016 | Shtukater |
| 2017/0078652 A1 | 3/2017 | Hua et al. |
| 2018/0084232 A1 | 3/2018 | Belenkii et al. |

FOREIGN PATENT DOCUMENTS

| | | |
|---|---|---|
| JP | 2003194697 A | 7/2003 |
| JP | 2004273203 A | 9/2004 |
| KR | 1020150018769 A | 2/2015 |
| WO | 2013180725 A1 | 12/2013 |
| WO | 2017039820 A1 | 3/2017 |
| WO | 2017065819 A1 | 4/2017 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Huang, Fu-Chung, et al., "The Light Field Steroscope—Immersive Computer Graphics via Factored Near-Eye Field Displays with Focus Cues," SIGGRAPH 2015, 12 pages, Stanford Computational Imaging Lab, computationalimagaing.org.

Lanman, Douglas, et al., "Near-Eye Light Field Displays," ACM Transactions on Graphics (TOG)—Proceedings of ACM—SIGGRAPH Asia, Nov. 2013, 10 pages, vol. 32, Issue 6, Article No. 220.

Hua, Hong, et al., "A 3D integral imaging optical see-through head-mounted display," Optics Express, Jun. 2, 2014, pp. 13484-13491, vol. 22, No. 11, Copyright OSA 2014.

Cheng, Dewen, et al., "Design of a wide-angle, lightweight head-mounted display using free-form optics tiling," Optics Letters, Jun. 1, 2011, pp. 2098-2100. vol. 36, No. 11.

Maimone, et al., Computational Augmented Reality Eyeglasses, IEEE International Symposium on Mixed and Augmented Reality (ISMAR) 2013 Science and Technology Proceedings, Oct. 1, 2013, pp. 29-38.

Ho, et al., Contact lens with integrated inorganic semiconductor devices, IEEE 21st International Conference on Micro Electro Mechanical Systems, 2008, MEMS 2008, Jan. 1, 2008, pp. 403-406.

Lingley, et al., A single-pixel wireless contact lens display, Journal of Micromechanics and Micorengineering, Nov. 22, 2011, 15 pages, vol. 21, No. 12.

Park, et al., Soft, smart contact lenses with integrations of wireless circuits, glucose sensors, and displays, Science Advances (Sci. Adv.), Applied Sciences and Engineering; Jan. 24, 2018, pp. 1-11, vol. 4, No. 1.

\* cited by examiner

DIFFRACTIVE BACKLIGHT DISPLAY AND SYSTEM

CROSS-REFERENCE TO RELATED APPLICATIONS

This application is a continuation patent application of and claims the benefit of priority to International Application No. PCT/US2016/040904, filed Jul. 2, 2016, which claims the benefit of priority to U.S. Provisional Patent Application Ser. No. 62/214,976, filed Sep. 5, 2015; and also to International (PCT) Application No. PCT/US2016/40582, filed Jun. 30, 2016, the entire contents of which are herein incorporated by reference.

BACKGROUND

In recent years, head-mounted display ("HMD") technology has increased in popularity with applications in virtual and augmented reality. An HMD is a display device worn on a user's head typically in the form of eyeglasses, goggles, a helmet, or a visor. The display device may be a single small electronic display unit positioned in the field of view of one eye of the user when the HMD is worn by the user, or the display device may be implemented with two separate small electronic display units positioned in the field of views of both eyes of the user when the HMD is worn by the user. For example, the small electronic display units may be implemented using either a small plasma display panel or a liquid crystal display. A small display unit used in an HMD may also be implemented with one or more lenses, collimating reflectors, and semi-transparent mirrors that focus the image created with the display panel. An HMD may use one display unit to create an augmented reality viewing experience, or an HMD may be implemented with two display units to create a virtual reality viewing experience.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments may have other features that are one of in addition to and in lieu of the features illustrated in the above-referenced figures. These and other features are described below with reference to the above-referenced figures.

DETAILED DESCRIPTION

Embodiments in accordance with the principles described herein provide diffraction grating-based backlight displays implemented with a diffractive backlight system. The diffractive backlight system comprises a light source and a plate light guide. A surface of the plate light guide is configured with a diffraction grating. According to some embodiments, the diffraction grating may comprise curved diffractive features (e.g., curved ridges and grooves). Light generated by a light source may be coupled into the plate light guide along a plate-light-guide edge. The diffraction grating is configured to couple light out of the plate light guide and to concentrate the light in a localized region of space located a distance from the diffraction grating. For example, the diffraction grating may couple out a portion of the light that is coupled into the plate light guide. A first light valve array, such as a liquid crystal display, may be disposed in the path of the light output from the diffraction grating to form a display that concentrates images for viewing in the localized region of space. In some embodiments, the display may include a second light valve array disposed in the path of light passing through the first light valve array in order to provide eye accommodation in the localized region of space. In an embodiment, the second light valve array may be a planar light valve array. In another embodiment, the second light valve array may be a pixelated contact lens worn by a viewer. One or two of the diffraction grating-based backlight displays may be used in head-mounted displays in order to generate focused augmented or virtual reality images for wearers.

Figure 1A:
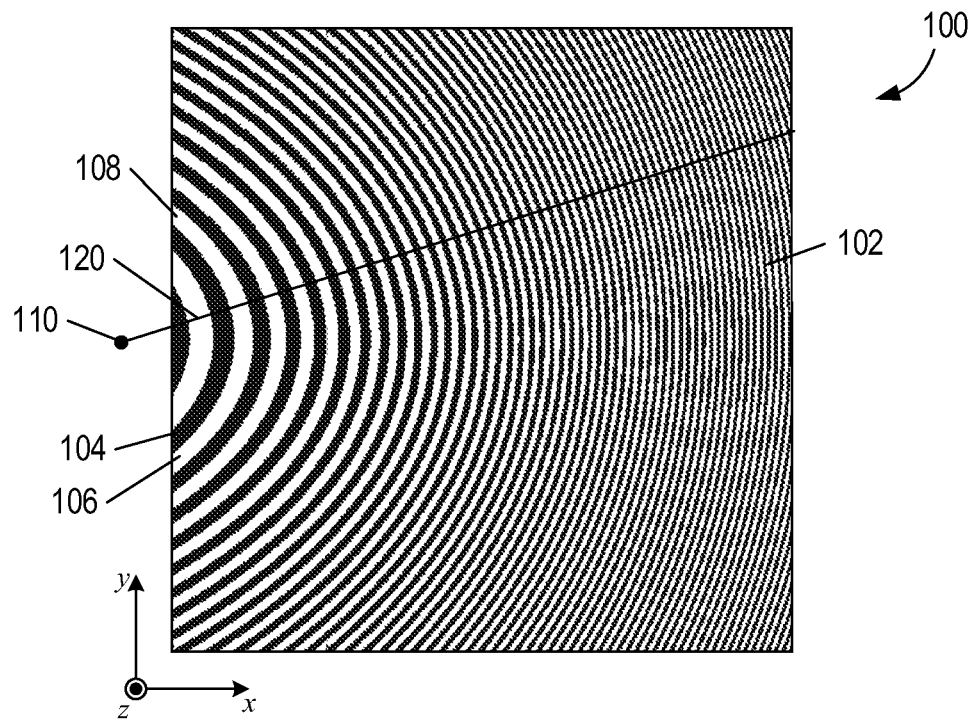
FIG. 1A shows a plane view of a plate light guide configured with a diffraction grating.

FIG. 1A shows a plan view of a diffraction grating pattern of a diffraction grating 102 formed on surface of the plate light guide 100. A Cartesian coordinate system with orthogonal x, y, and z axes is used to describe different orientations of the plate light guide 100 below. As shown in FIG. 1A, concentric black and white curves, such as black curve 104 and white curve 106, represent curved diffractive features. The curved diffractive features represented by curves 104, 106 may comprise alternating curved ridges and grooves on a surface of the plate light guide 100, in some embodiments. The alternating curved ridges and grooves may have or share a common center 110 of curvature located a distance from an edge 108, as illustrated. As such, the alternating curved ridges and grooves may be alternating concentric curved ridges and grooves and represent concentric curved diffractive features. The alternating curved ridges and grooves or more generally the curved diffractive features form a diffraction grating pattern of the diffraction grating 102, according to various embodiments.

In some embodiments, the curved diffractive features may follow or be defined by a hyperbolic curve (i.e., defined by or based on a hyperbola) and thus may be "hyperbolic-shaped." In particular, the curved diffractive features may be concentric hyperbolic-shaped curved diffractive features (e.g., concentric hyperbolic-shaped alternating curved ridges and grooves), according to some embodiments. In other embodiments, the curved diffractive features or the curved ridges and grooves that form the diffraction grating 102 may be either semicircular or concentric semicircular in shape (e.g., semicircular with the common center 110 of curvature located away from the edge 108). In yet other embodiments, another curved shape that is substantially neither hyperbolic-shape or semicircular shape may be employed to define a curve of the curved diffractive features.

Figure 1B:
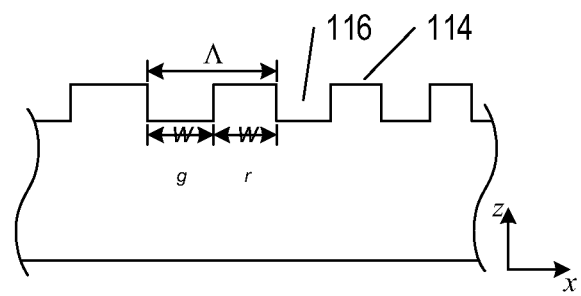
FIG. 1B shows a magnified cross-sectional view of a diffraction grating.

FIG. 1B shows a magnified xz-plane, cross-sectional view of the plate light guide 100. In this view, the diffraction grating 102 comprises ridges, such as ridge 114, that protrude in the z-direction and are separated by grooves, such as groove 116. The width of a groove is denoted by $w_g$ and the width of a ridge is denoted by $w_r$. The sum of the groove width $w_g$ and the ridge width $w_r$ is called the "feature spacing" and is denoted by $\Lambda$. As shown in FIG. 1A, the widths of the grooves and ridges are substantially constant along of the lengths of the grooves and ridges. Each pair of adjacent grooves and ridges is called a "diffractive feature" and the feature spacing $\Lambda$ along the length of a diffractive feature is substantially constant.

Figure 1C:
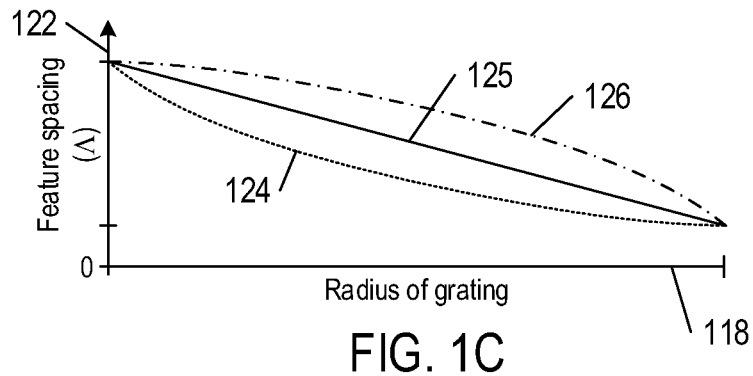
FIG. 1C shows a plot of diffractive feature spacing of a diffraction grating as a function of distance.

FIG. 1C shows a plot of diffractive feature spacing as a function of radial distance from the common center 110. Horizontal axis 118 represents radial distance from the common center 110 along a radius, such as radius 120 in FIG. 1A, extending from the common center 110. Vertical axis 122 represents the feature spacing $\Lambda$. Curves 124-126 represents ways in which the feature space varies with increasing distance from the common center 110. Curve 124 represents an exponential decrease in feature spacing with increasing distance from the common center 110. Curve 125 represents a linear decrease in f with increasing distance from the common center 110. Curve 126 represents a hyperbolic decrease in feature spacing with increasing distance from the common center 110.

In the example of FIG. 1B, and in subsequent illustrations, cross-sectional views of the diffractive features are represented by rectangular-shaped grooves and ridges. In other embodiments, the ridges and grooves of the diffraction grating 102 may have a saw-tooth, a trapezoidal, or a hemispherical cross-sectional shape. For example, diffractive features of the diffraction grating 102 may have ridges with a trapezoidal cross section.

The plate light guide 100 may be a plate optical waveguide in the form of an extended, substantially planar sheet or slab of optically transparent, dielectric material. The plate light guide 100 may comprise any one of a number of different optically transparent materials or comprise any of a variety of dielectric materials including, but not limited to, one or more of various types of glass, such as silica glass, alkali-aluminosilicate glass, borosilicate glass, and substantially optically transparent plastics or polymers, such as poly(methyl methacrylate) or acrylic glass, and polycarbonate. In some embodiments, the plate light guide 100 may include a cladding layer on at least a portion of a surface of the plate light guide 100 (not illustrated) to facilitate total internal reflection.

The diffraction grating 102 may be formed using any one of many different microfabrication techniques, including, but not limited to, wet etching, ion milling, photolithography, anisotropic etching, and plasma etching. For example, as shown in FIG. 1B, the diffraction grating 102 of the plate light guide 100 may be formed in a slab of dielectric material using ion milling. In an embodiment, the diffraction grating 102 of the plate light guide 100 may be formed by depositing a layer of dielectric material or a metal on a surface of a slab of dielectric material followed by etching the deposited layer to from the diffraction grating 102.

Figure 2A:
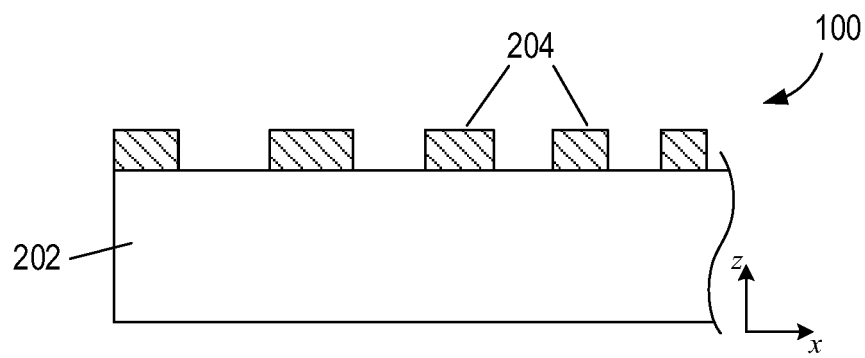
FIGS. 2A-2C shows cross-sectional views of different diffraction grating configurations.
Figure 2B:
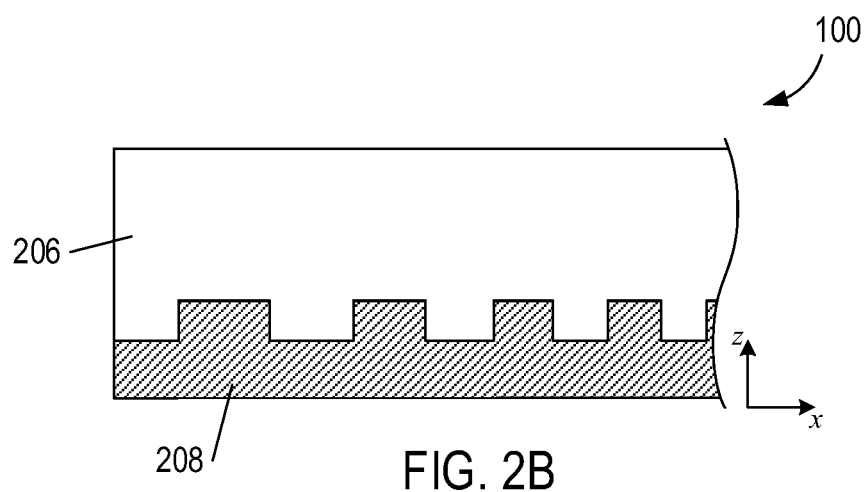
Figure 2C:
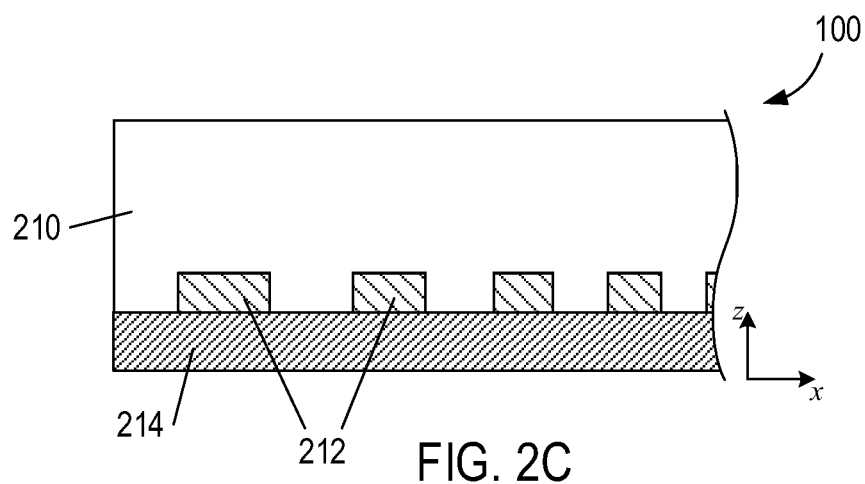

FIG. 2A shows a magnified xz-plane, cross-sectional view of the plate light guide 100 formed from a slab 202 of dielectric material with ridges 204 of the diffraction grating formed on a top surface of the slab 202 from a material (i.e., dielectric material or metal) that is different from that of the slab 202. In other embodiments, the diffraction grating 102 may be formed in the bottom surface of the plate light guide 100. FIG. 2B shows a magnified xz-plane, cross-sectional view of the plate light guide 100 with the diffraction grating 102 formed in a bottom surface of a slab 206 of dielectric material. In this embodiment, a bottom layer 208 of material covers the diffraction grating 102 and substantially fills the grooves between ridges. The bottom layer 208 may be metal, a reflective material, or a dielectric material with a lower refractive index than the slab 206. FIG. 2C shows a magnified xz-plane, cross-sectional view of the plate light guide 100 with the diffraction grating 102 formed in a bottom surface of a slab 210 of dielectric material. In this embodiment, grooves, such as grooves 212, are filled with a metal or a dielectric material having a lower refractive index than the slab 210. A reflective layer 214 covers the bottom surface of the plate light guide 100.

Figure 3A:
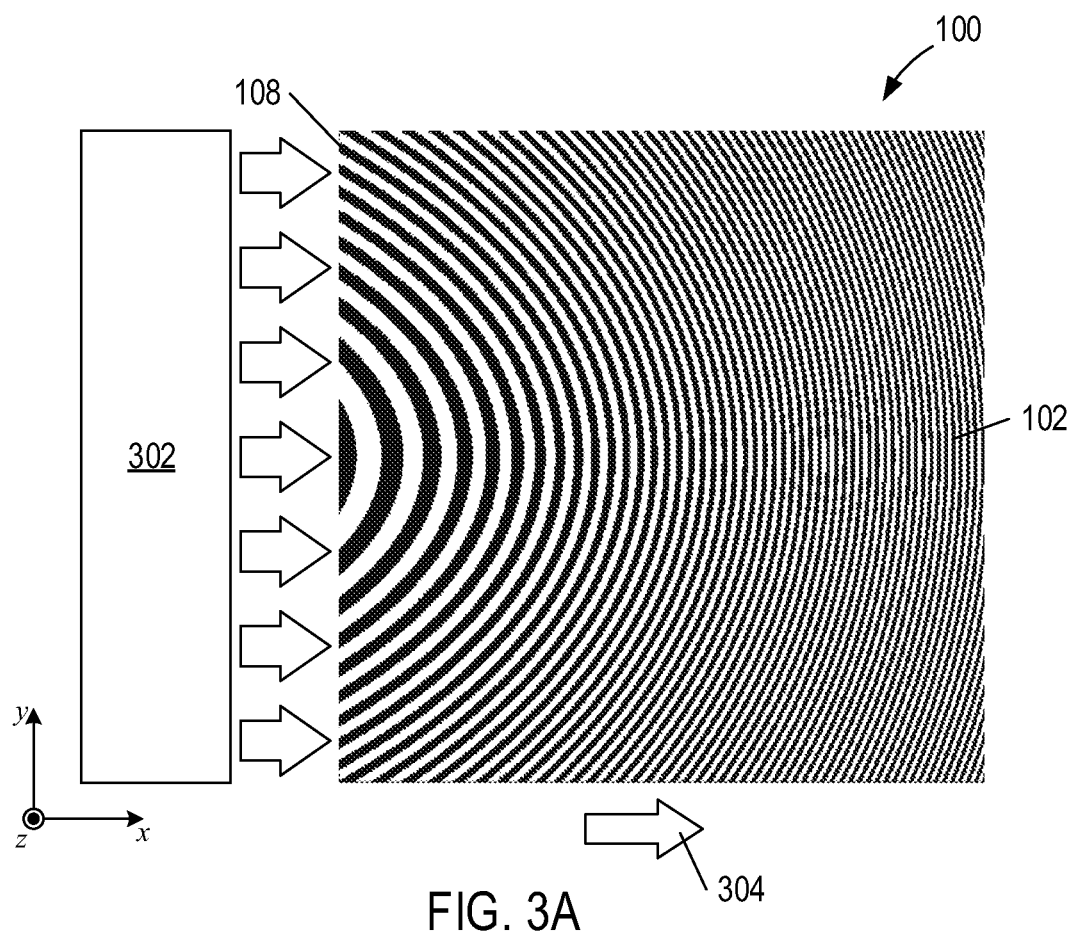
FIG. 3A shows a plan view of a diffractive backlight system.

FIG. 3A shows a plan view of a diffractive backlight system 300. The diffractive backlight system 300 includes a light source 302 and the plate light guide 100. Light generated by the light source 302 is coupled into the plate light guide 100 along the edge 108 called the "light-entrance edge." The light source 302 and plate light guide 100 form a diffractive backlight system. The light source 302 may be a light emitting diode ("LED"), an organic LED, a polymer LED, a plasma-based optical emitter, fluorescent lamp, or an incandescent lamp, for example. The light output from the light source 302 may be white light (i.e., includes nearly all wavelengths in the visible spectrum) or a particular color in a narrow wavelength band of the visible spectrum. As shown in FIG. 3A, the light coupled into the plate light guide 100 along the light-entrance edge 108 propagates in a direction 304 within the plate light guide 100 away from the light-entrance edge 108. In other word, the light is coupled into the plate light guide 100 along the light-entrance edge 108 so that the light propagates within the plate light guide 100 in the general direction of decreasing feature spacing of the diffractive features.

Figure 3B:
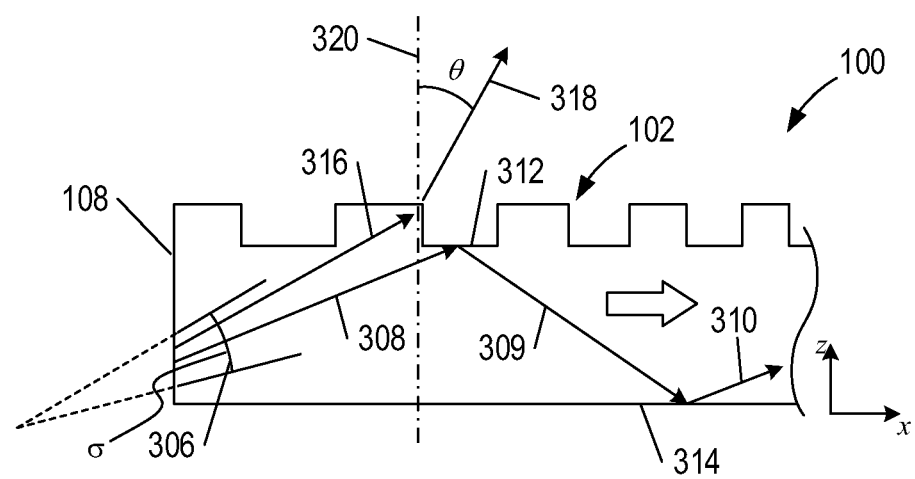
FIG. 3B shows a cross-sectional view of a plate light guide near a light-entrance edge.

FIG. 3B shows an xz-plane, cross-sectional view of the plate light guide 100 near the light-entrance edge 108. Light is coupled into the plate light guide 100 along the light-entrance edge 108 and propagates within the plate light guide 100 in the general direction of decreasing feature spacing. Light that is coupled into the plate light guide 100 within a range of angles, denoted by σ and called the "internal reflection angular divergence," experiences total interval reflection and is trapped within the plate light guide 100. For example, curve 306 represents the internal reflection angular divergence σ and directional arrows 308-310 represents a ray path of light input to the plate light guide 100 within the internal reflection angular divergence σ. At each point of reflection from an opposing top and bottom surfaces, such as top surface 312 and bottom surface 314, the light strikes the opposing surfaces at angles less than a critical angle and is trapped within the plate light guide 100. However, at least a portion of the light that is trapped within the plate light guide 100 interacts with the diffraction grating 102, such as light propagating along a ray path 316. The light that interacts with the diffraction grating 102 is coupled out of the plate light guide 100 as a first order diffraction beam. The zeroth and higher order diffraction beams of light may be suppressed, for example. For example, ray 318 represents first order diffracted light that is coupled out of the plate light guide 100 at a diffraction angle θ with respect to the normal direction 320 of the plate light guide 100.

Figure 4:
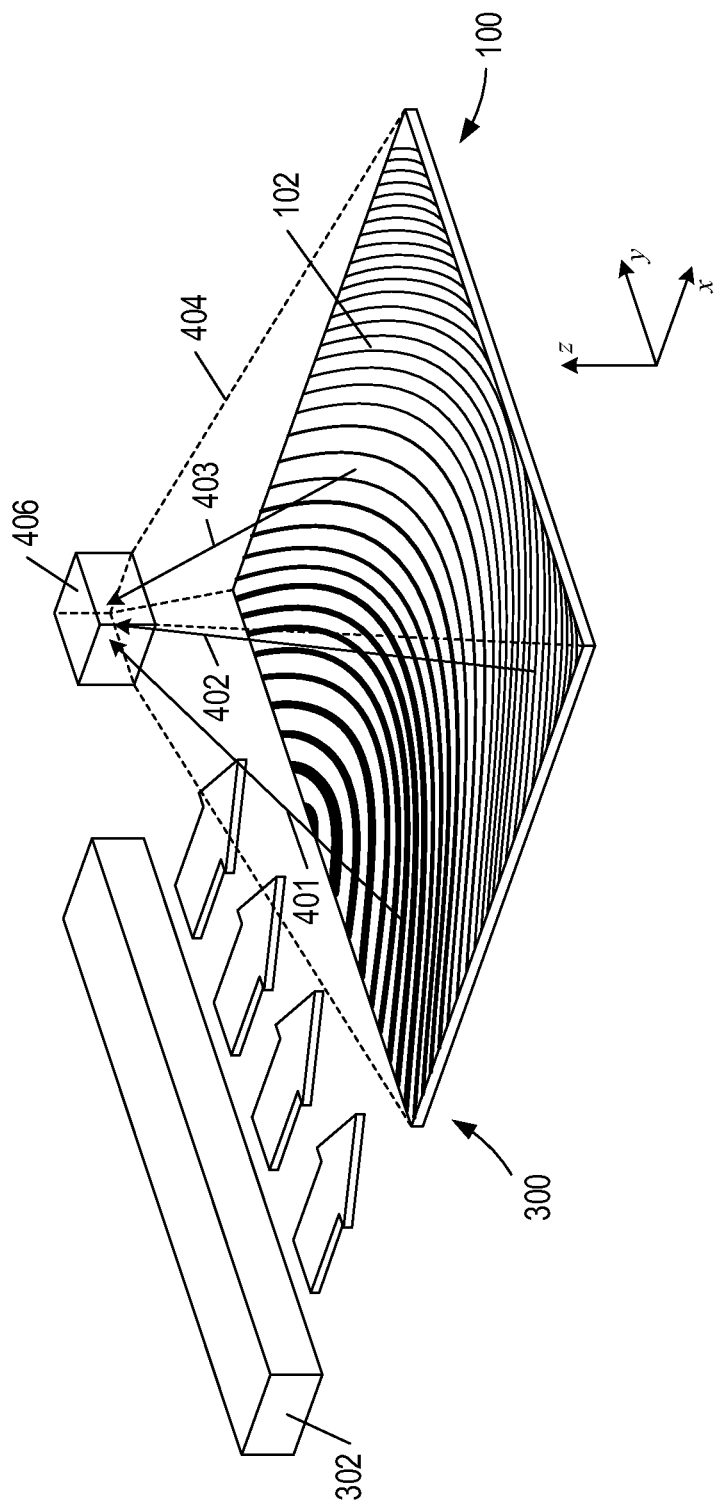
FIG. 4 shows an isometric view of a diffractive backlight system.

The pattern and feature spacing of the diffraction grating 102 causes first order diffracted light to be diffractively coupled out of the plate light guide 100 and converge in a substantially localized region of space called an "eyebox." FIG. 4 shows an isometric view of the diffractive backlight system 300 in which light generated by the light source 302 is coupled into the plate light guide 100. The diffraction grating 102 causes at least a portion of the light input to the plate light guide 100 within the internal reflection angular divergence σ to be diffractively coupled out of the plate light guide 100 within a pyramid-shaped or cone-shaped light-transmission region 404 and converge into an eyebox 406. Directional arrows 401-403 represent first order diffracted light coupled out of the plate light guide 100 at different points of the diffraction grating 102 within the light-transmission region 404 and into the eyebox 406. At distances beyond the eyebox 406 and away from the plate light guide 100 the light diverges.

Figure 5:
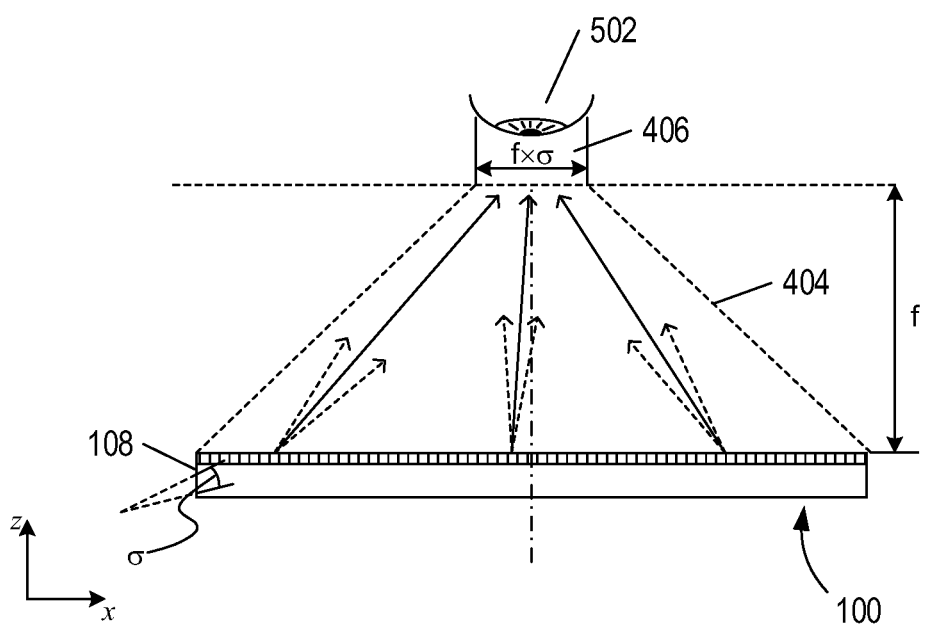
FIG. 5 shows a side-elevation view of a plate light guide that concentrates light into a localized region of space.

FIG. 5 shows an xz-plane, side elevation view of light output from the plate light guide 100 and into a viewer's eye 502 located within the eyebox 406. An approximate width of the eyebox 406 is given by a product of a distance f of the eyebox 406 from the plate light guide 100 and the internal reflection angular divergence σ.

$$\text{eyebox width}=f\times\sigma$$

In FIG. 5, the decreasing feature spacing of the diffractive features away from the light-entrance edge 108 and the internal reflection angular divergence σ concentrate the light coupled out of the diffraction grating 102 and into the eyebox 406 located the distance f from the plate light guide 100. As a result, at least a portion of the light field coupled out of the plate light guide 100 may be concentrated on the retina of the viewer's eye 502 when the viewer's eye is located in the eyebox 406.

It should also be noted that the coupled out of the diffraction grating 102 is effectively confined to the light-transmission region 404 and the eyebox 406. As a result, when the viewer's eye 502 is located outside the eyebox 406, or outside the light-transmission region 404, light output from the diffraction grating 102 does not enter the viewer's eye 502 and the diffraction grating 102 appears black.

Figure 6:
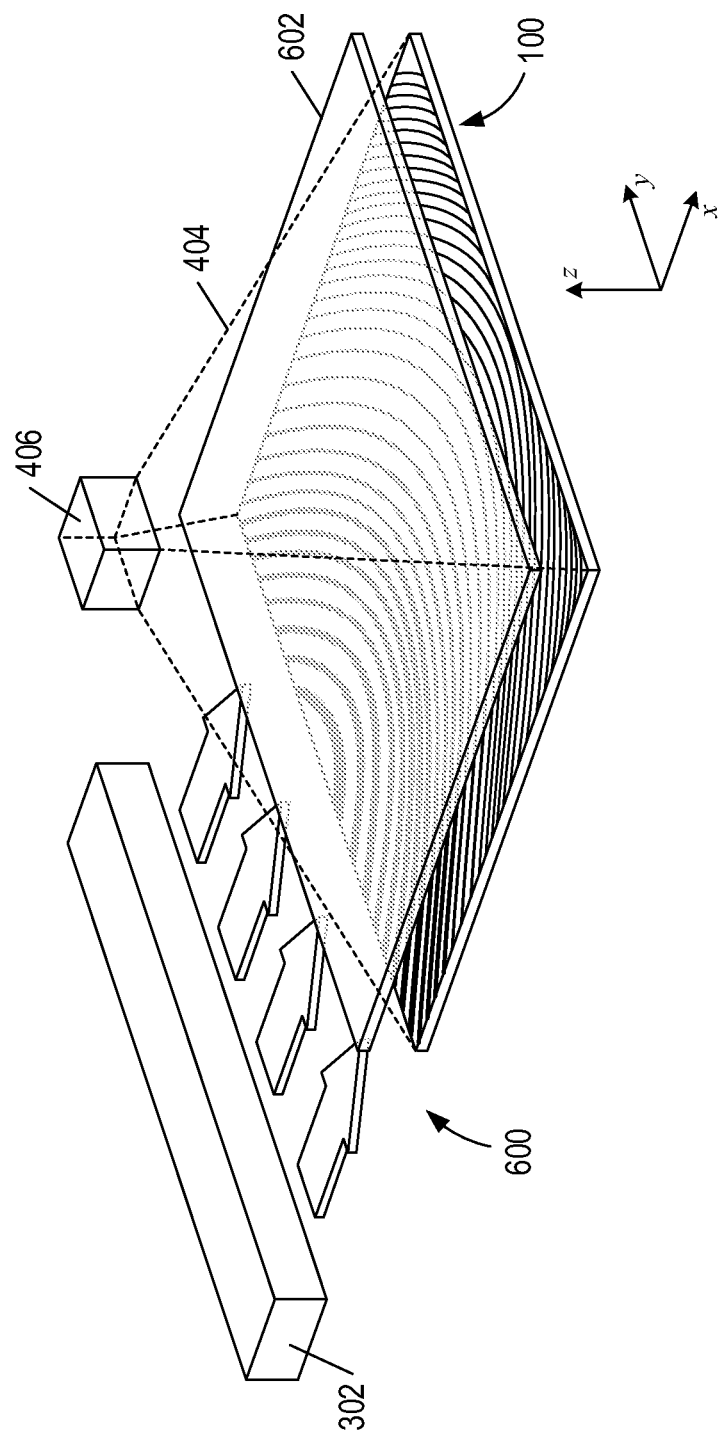
FIG. 6 shows an isometric view of a display.

The diffractive backlight system 300 may be combined with a light valve array to form a display that projects images onto the retina of a viewer's eye when the viewer's eye is located in the eyebox 406. FIG. 6 shows an isometric view of a display 600 that includes the plate light guide 100, a light valve array 602, and the light source 302. The light valve array 602 is positioned substantially parallel to the plate light guide 100 (i.e., lies within the xy-plane) and intersects the light-transmission region 404 so that light coupled out of the diffraction grating 102 passes through the light valve array 602 and is concentrated in the eyebox 406.

Figure 7:
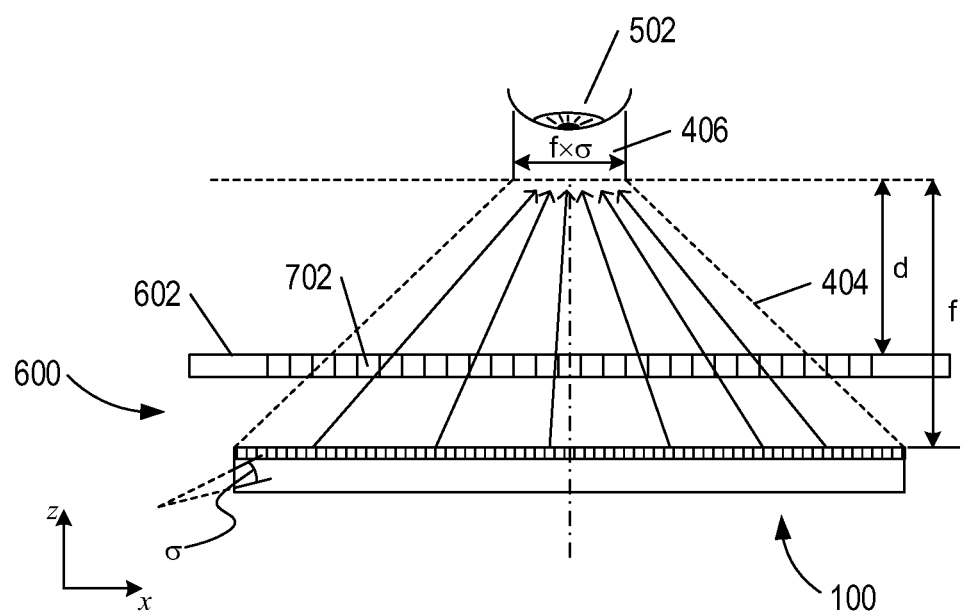
FIG. 7 shows a side-elevation view of a display.

FIG. 7 shows an xz-plane, side elevation view of the display 600 with the light valve array 602 positioned a distance d from the eyebox 406. As shown in FIG. 7, the light valve array 602 is oriented substantially parallel to the plate light guide 100 in order to intersect the light-transmission region 404. The light valve array 602 comprises an array of separately operated light valves, such as light valve 702. The light valve array 602 may be formed from an array of liquid crystal light valves, each of which may be individually operated as a pixel that modulates the amount of light passing through a light valve. The light valve 702 may be switched between opaque and transparent in order to control the amount of light that passes through the light valve 702. The light valves may be colored light valves, such as red, green, and blue light valves, that are used to create full color images. Light passing through each light valve of the light valve array 602 may be selectively modulated to create a full color or black and white image for viewing in the eyebox 406.

Figure 8:
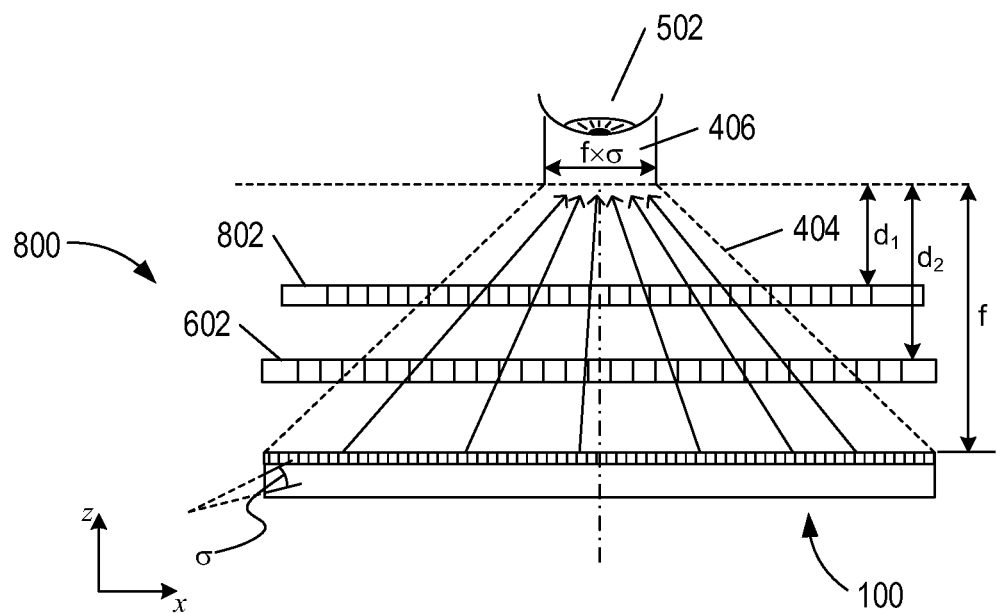
FIGS. 8-9 show side-elevation views of two different displays.

FIG. 8 shows a near-eye diffraction grating-based backlight display 800 that provides eye accommodation. The near-eye diffraction grating-based backlight display 800 is similar to the near-eye diffraction grating-based backlight display 700 except the near-eye diffraction grating-based backlight display 800 includes a second light valve array 802 oriented substantially parallel to the plate light guide 100 and positioned between the first light valve array 602 and the eyebox 406. In FIG. 8, the second light valve array 802 is located a distance $d_1$ from the eyebox 406 and the first light valve array 602 is located a distance $d_2$ from the eyebox 406 and between the second light valve array 802 and the plate light guide 100. Light passes through light valves in the first light valve array 602 and light valves in the second light valve array 802. The first and second light valve arrays 602 and 802 may be operated to provide eye accommodation. For example, the first and second light valve arrays 602, 802 may be operated in a multiplicative manner (e.g., to implement factored light field synthesis) to obtain an image that facilitates eye accommodation. The viewer's eye focuses on the image created with combined operation of first light valve array 602 and the second light valve array 802 according to a virtual depth of field created by a multiplication of transmission characteristics of the two light valve arrays 602, 802, for example.

Figure 9:
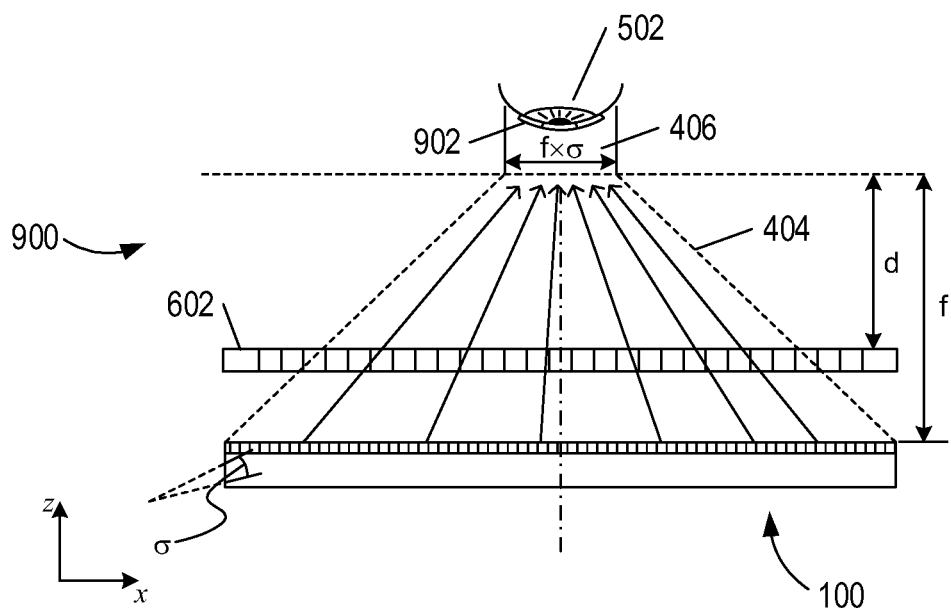

FIG. 9 shows a near-eye diffraction grating-based backlight display 900 that provides eye accommodation. The near-eye diffraction grating-based backlight display 900 is operated with a second light valve array in the form of a pixelated contact lens 902 disposed on the viewer's eye 502. The pixelated contact lens 902 comprises a plurality of individually operated pixels configured to control an amount of light that enters the viewer's eye when the viewer's eye is located in the eyebox. For example, the pixelated contact lens 902 may comprises an array of 2-9 light valves (i.e., pixels) per pupil area and may be operated by individually turning "on" only one light valve (i.e., transparent) at a time while the remaining light valves are turned "off" (i.e., opaque). For example, the pixelated contact lens 902 may be a bionic lens with independently controlled light valves. The pixelated contact lens 902 may comprise liquid crystal light valves that modulate the amount of light that passes through the pixelated contact lens 902 and into the viewer's eye 502. The light valves in the first light valve array 602 and the pixelated contact lens 902 may be independently modulated to control the direction light enters the viewer's eye 502 in order to facilitate eye accommodation. For example, by switching "on" only one light valve at a time, the direction of light entering the viewer's eye is changed, which enables different images displayed with the first light valve array 602 to enter the viewer's eye from different directions, which may trigger a focusing response of the viewer's eye 502, creating an effect of objects being displayed in different images and at different distances from the viewer. The accommodation response time of a viewer's eye may be about 0.3 seconds, which may decrease an effective refresh rate of the first light valve array 602 that may be needed to support the accommodation response, for example.

In other embodiments, a plate light guide may comprise a plurality of diffraction grating segments that corresponds to different region of the diffraction grating 102 and are separated by unpatterned spaces. The diffraction grating segments of the plurality may be two-dimensional diffraction grating segments, for example. Although the diffraction grating segments correspond to different regions of the diffraction grating 102 and are separated by unpatterned spaces, the diffraction grating segments collectively couple out light and concentrate the light in the same manner as the diffraction grating 102.

Figure 10A:
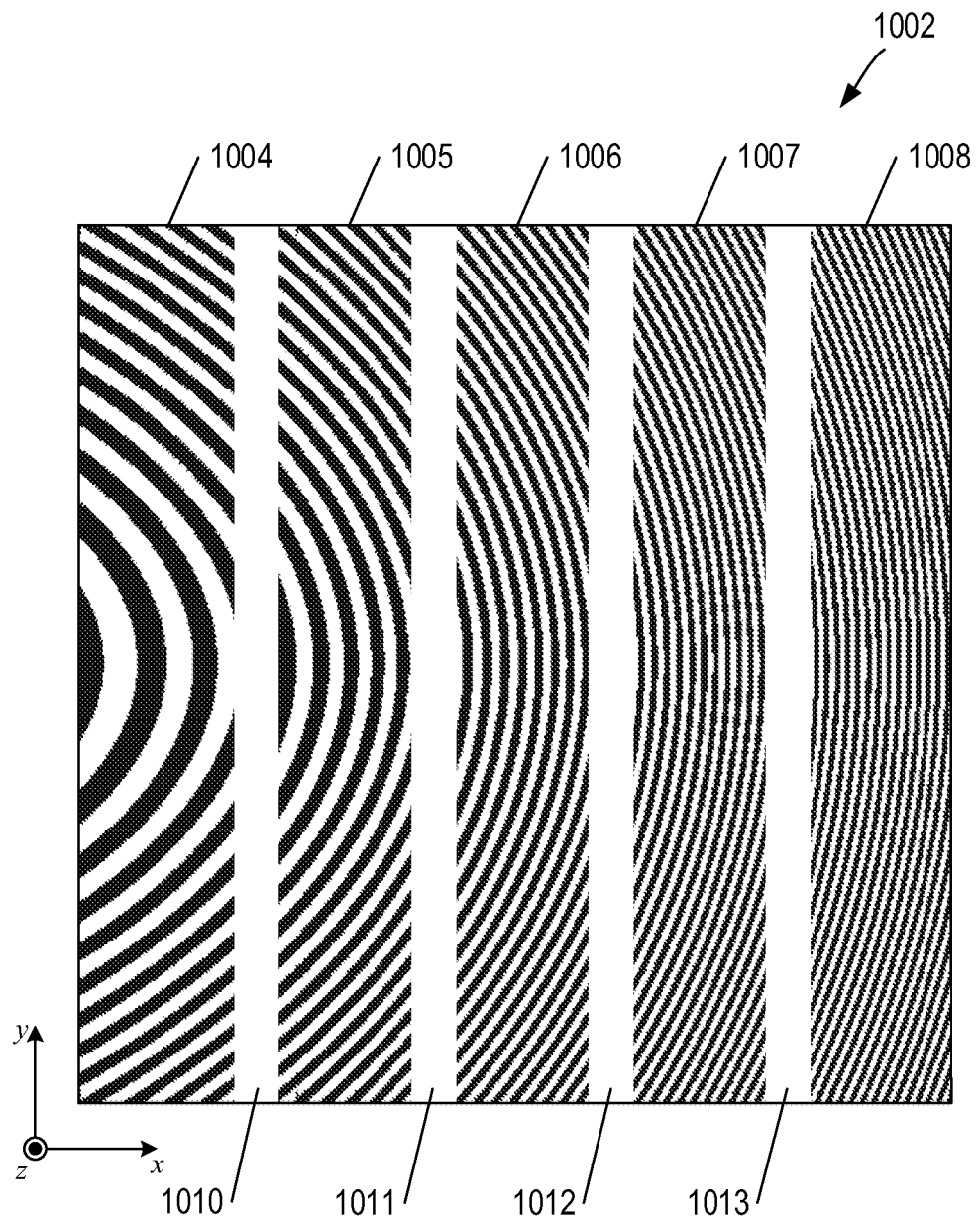
FIGS. 10A-10C show plan views of different plate light guide configurations.
Figure 10B:
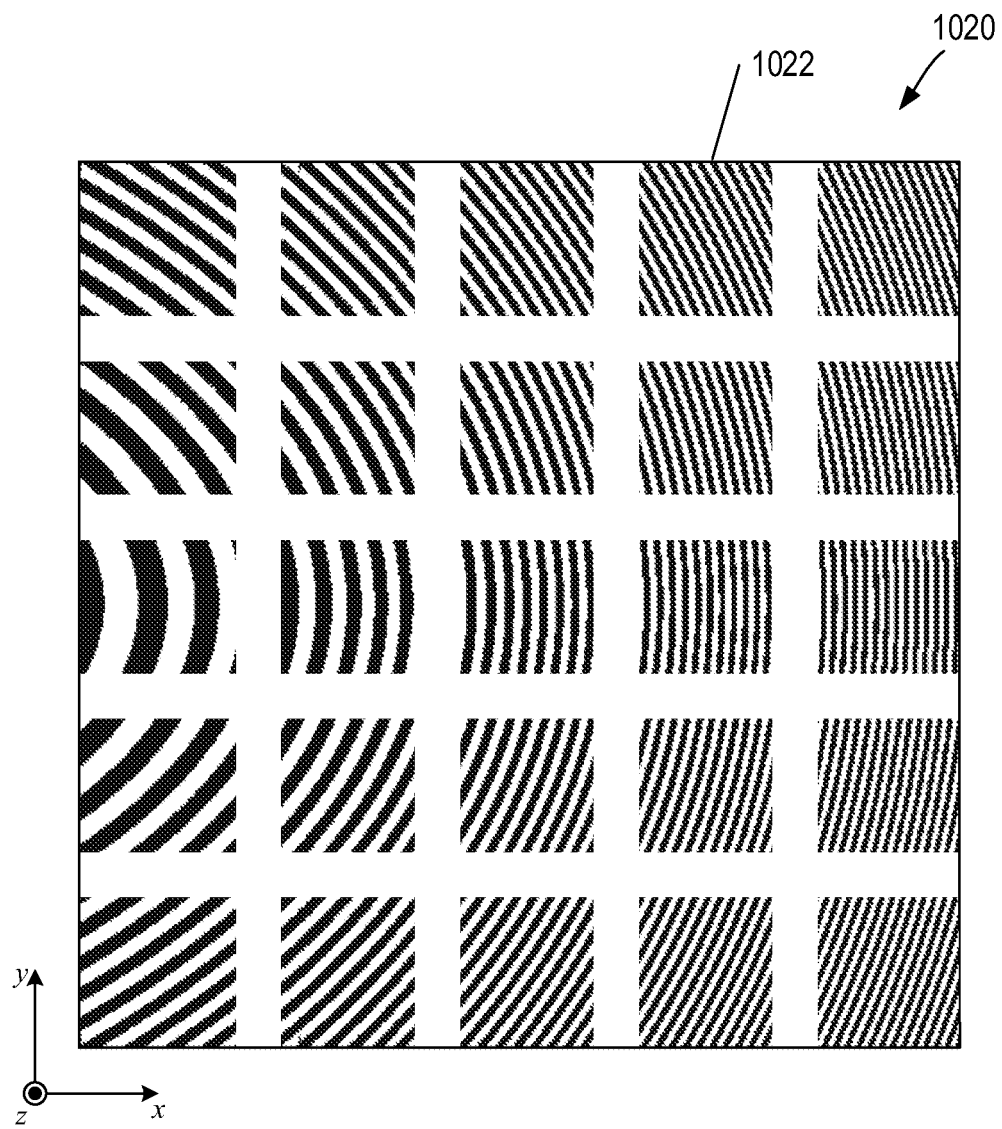
Figure 10C:
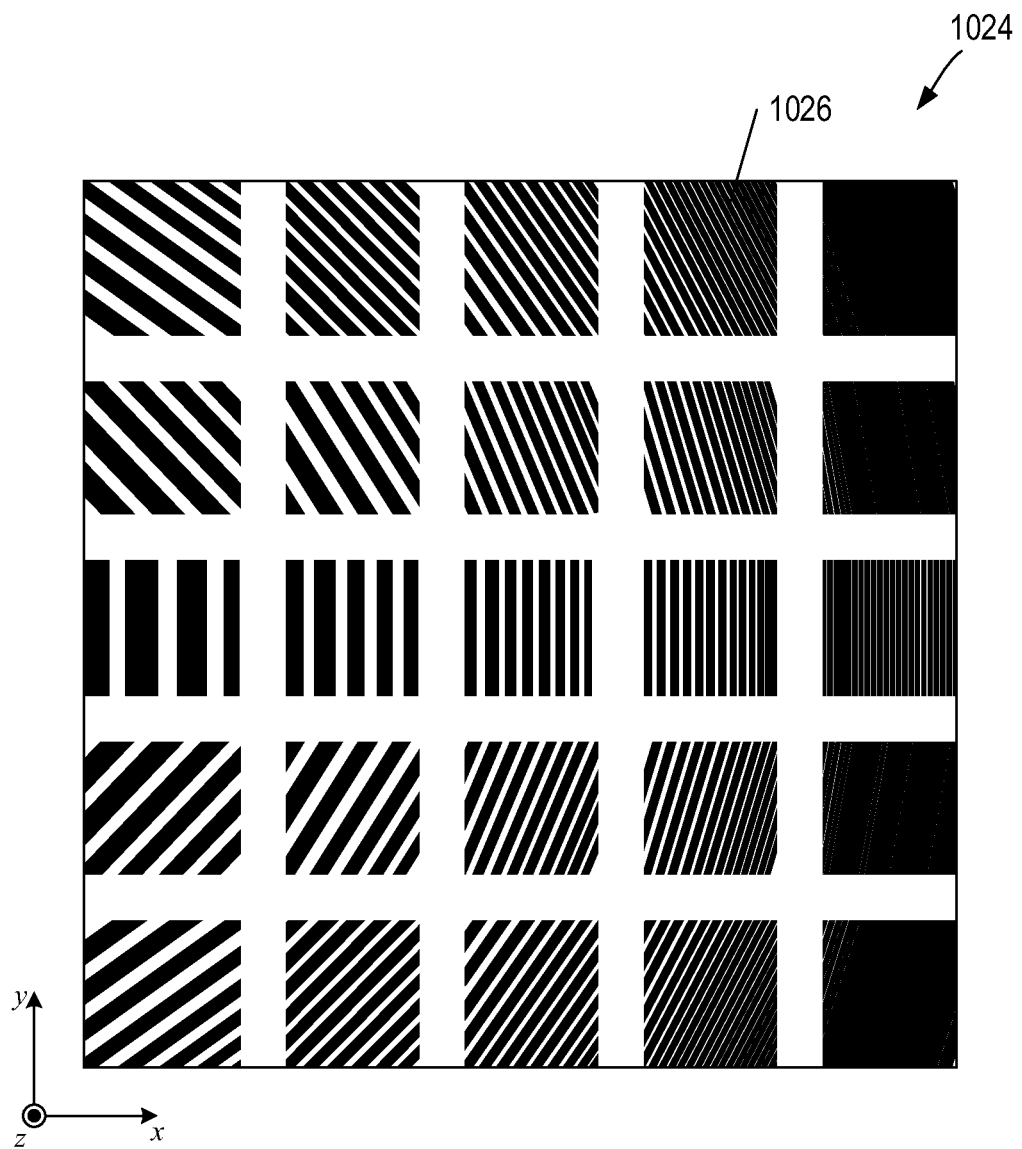

FIGS. 10A-10C show plate light guides comprising diffraction grating segments that correspond to different regions of the diffraction grating 102. FIG. 10A shows a plate light guide 1002 that is similar to the plate light guide 100 describe above, but the plate light guide 1002 includes five diffraction grating segments 1004-1008 that corresponds to different regions of the diffraction grating 102 separated by unpatterned spaces 1010-1013 in one dimension. FIG. 10B shows a plate light guide 1020 that is similar to the plate light guide 100 described above, but the diffraction grating segments, such as diffraction grating segment 1022, are separated by unpatterned spaces in two dimensions (i.e., the diffraction grating segments are two-dimensional). The diffraction-grating patterns of the diffraction grating segments also correspond to different regions of the diffraction grating 102. In other embodiments, the diffraction grating segments may comprise straight features. FIG. 10C shows a plate light guide 1024 that is similar to the plate light guide 1020 described above, but the plate light guide 1020 includes twenty-five diffraction grating segments, such as diffraction grating segment 1026, formed from straight features. Because of the surface area taken up by the spaces between diffraction grating segments the plate light guides 1002, 1020, and 1024 couple out less light than the plate light guide 100.

It should be noted that plate light guides formed from diffraction grating segments that correspond to different regions of the diffraction grating 102 are not limited to rectangular-shaped diffraction grating segments as shown in FIGS. 10A-10C. In other embodiments, plate light guides may be configured with circular, elliptical, triangular, or irregular-shaped diffraction grating segments that correspond to different regions of the diffraction grating 102 and are separated by unpatterned spaces.

Figure 11:
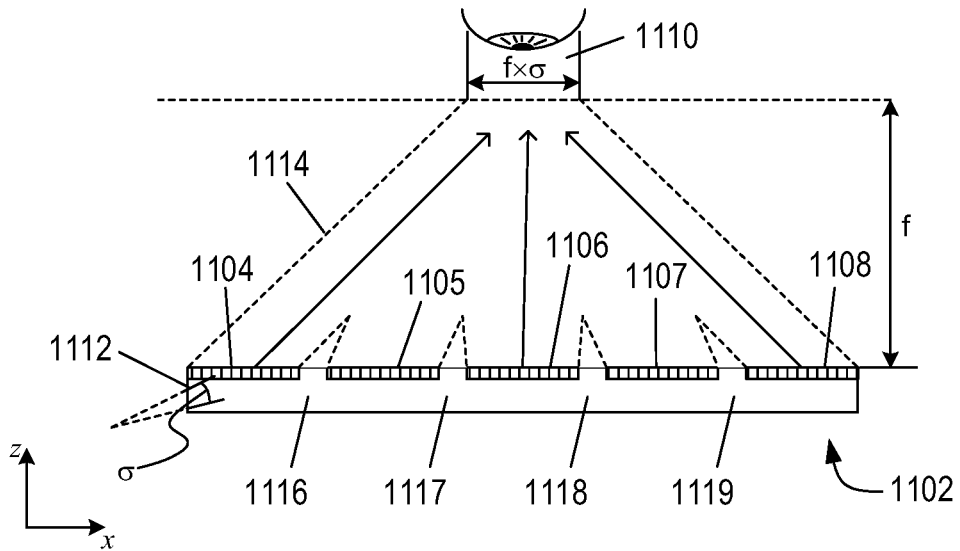
FIG. 11 shows a side-elevation view of a diffractive backlight system.

A plate light guide configured with diffraction grating segments that correspond to different regions of the diffraction grating 102 concentrate light into localized region of space in the same manner as the plate light guide 100 described above with reference to FIGS. 5 and 6. FIG. 11 shows an xz-plane, side elevation view of a plate light guide 1102 with diffraction grating segments 1104-1108 configured to concentrate light into an eyebox 1110 located a distance f from the plate light guide 1102. Light enters the plate light guide 1102 along light-entrance edge 1112 within the internal reflection angular diffraction σ. A portion of the light is coupled out from the diffraction grating segments 1104-1108 and concentrated in the eyebox 1110. Because light is not coupled out through unpatterned spaces 1116-1119, less light may be concentrated in the eyebox 1110 than is concentrated in the eyebox 406 created by the plate light guide 100. A light-transmission region 1114 (outlined using dashed lines) may result from a combination of light concentration by the diffraction grating segments 1104-1108 and a lack of coupling out of light through the unpatterned spaces 1116-1119, for example. In some embodiments, the plate light guide 1102 may be substituted for the plate light guide 100 in the diffractive backlight system 300 described above to form a partial near-eye diffractive backlight system.

Figure 12:
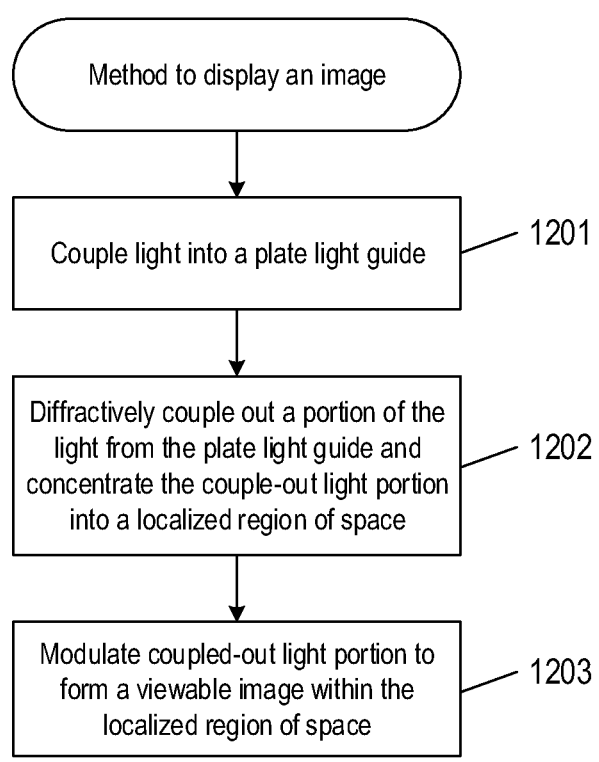
FIG. 12 shows a flow diagram of a method to display an image in a localized region of space.

FIG. 12 shows a flow diagram of a method to display an image in a localized region of space. In block 1201, light is coupled into a plate light guide as described above with reference to FIGS. 3A and 3B. The plate light guide is configured with a two-dimensional diffraction grating as described above with reference to FIGS. 1A-1C and 10A-10C. In block 1202, a portion of the light propagating in the plate light guide is diffractively coupled out of the plate light guide through the diffractive grating and concentrated in a localized region of space called an "eyebox," as described above with reference to FIGS. 4-5. In block 1203, the coupled-out light portion is modulated using one or more light valve arrays to form a viewable image in the eyebox, as described above with reference to FIGS. 6-9. When a viewer's eye is located in the eyebox, the image is concentrated on the viewer's retina enabling the viewer to see the image.

Figure 13:
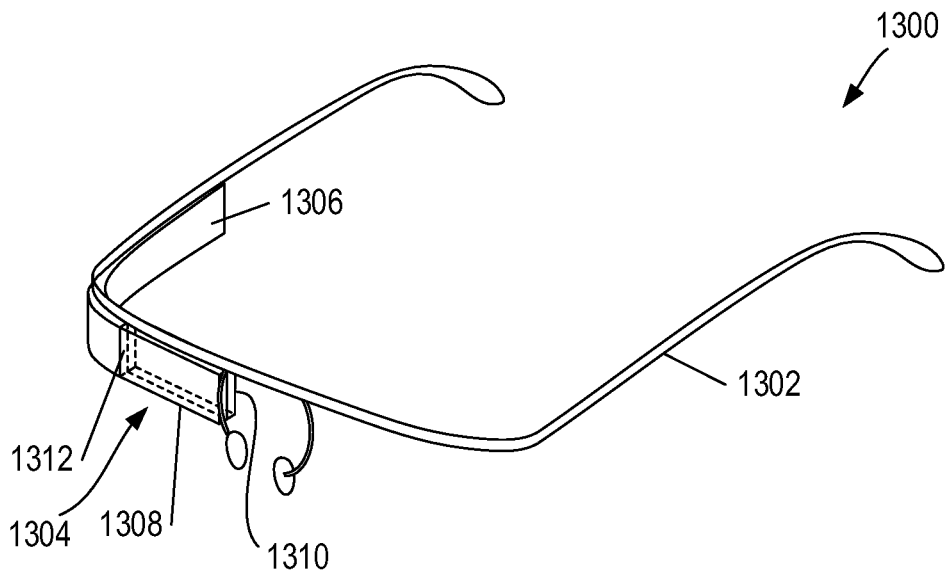
FIG. 13 shows a head-mounted display used to show augmented reality images.

Any one of the displays described above may be included in a head-mounted display ("HMD") to show virtual or augmented reality images. FIG. 13 shows an example of an HMD 1300 used to display augmented reality images. The HMD 1300 includes a frame 1302, a display 1304, and a display control 1306. The display 1304 includes a plate light guide 1308 and light valve array 1310. The plate light guide 1308 may be transparent, such as the plate light guide 100 described above with reference to FIG. 1B. The plate light guide 1308 and the light valve array 1310 are connected to the display control 1306, which includes a light source (not shown) that couples light into the plate light guide 1308 along a light-entrance edge 1312, as described above with reference to FIGS. 3A-3B, to form a diffractive backlight system of the display 1304. The light valve array 1310 is connected to the display control 1306. The display control 1306 sends signals that modulate the light valves of the light valve array 1310. As shown in FIG. 13, the display 1304 and the display control 1306 are suspended from the frame 1302 such that the display 1304 would be located in the field of view of the right eye of a person wearing the HMD 1300. The display control 1306 may include a wireless communications unit that wirelessly connects the display control 1306 to a broadcasting device, such as mobile phone, that is able to transmit signals to the wireless communications unit. The display control 1306 creates an augmented reality viewing experience by concentrating an image displayed on the light valve array 1310 in the right eye of a person wearing the HMD 1300. For example, the display 1304 may be used to create an augmented reality viewing experience by displaying the telephone number of a person calling the mobile phone of the person wearing the HMD 1300. Because the plate light guide 1308 is transparent, the person wearing the HMD 1300 may still be able to view their surroundings when not focusing on an image displayed on the display 1304.

Figure 14:
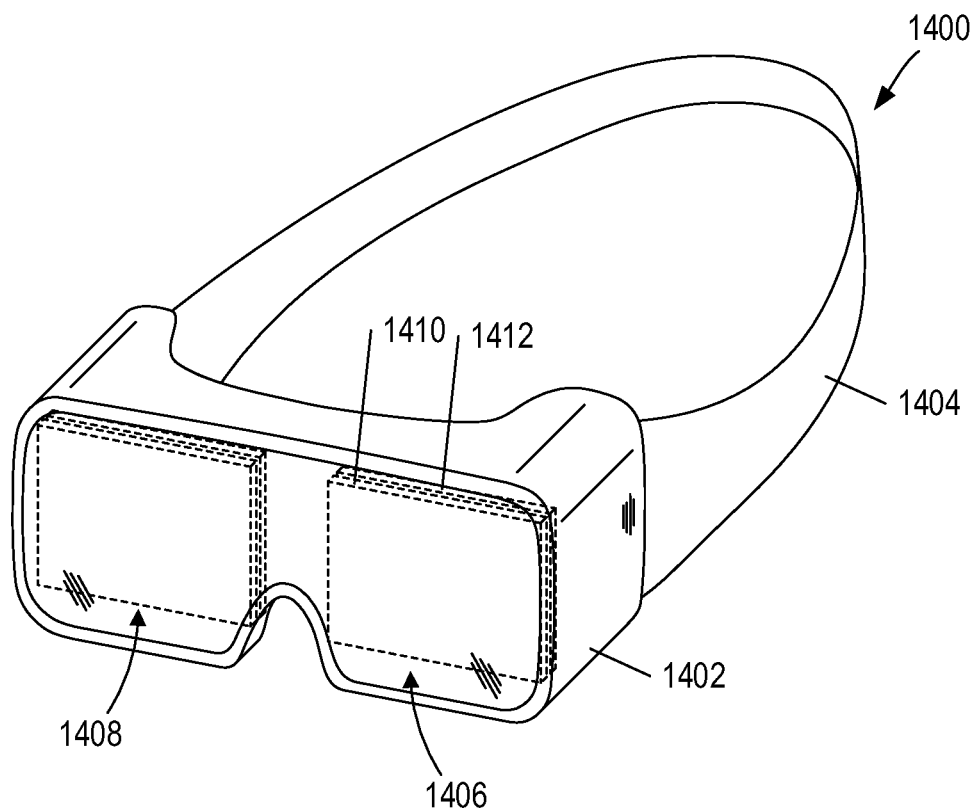
FIG. 14 shows a head-mounted display used to show virtual reality images.

FIG. 14 shows an example of an HMD 1400 in the form of goggles used to display virtual reality images. The HMD 1400 includes an eye cover 1402 and a strap 1404. The eye cover 1402 encloses both eyes of a person wearing the HMD 1400 and the strap 1404 secures the eye cover 1402 to the person's head. The eye cover 1402 includes a left-eye display 1406, a right-eye display 1408, and a display control (not shown) that may be located within the eye cover 1402. Each of the displays 1406 and 1408 includes a plate light guide, such as plate light guide 1410, and a light valve array 1412. The plate light guides may be configured as described above with reference to FIGS. 1B and 2A-2C. The plate light guides and light valve arrays are connected to the display control, which includes at least one light source (not shown) that couples light into light-entrance edges of the plate light guides, as described above with reference to FIGS. 3A-3B, to form a diffractive backlight system for each of the displays 1408 and 1406. The light valve arrays of the displays are also connected to the display control and receive control signals that modulate the light valves of the light valve arrays. As shown in FIG. 14, the displays 1406 and 1408 are located entirely within the eye cover 1402 and in the field of view of both eyes of a person wearing the HMD 1400. The display control may create a two- and three-dimensional virtual reality viewing experience by generating images in the light valve arrays of the displays 1406 and 1408 and the plate light guides of the displays 1406 and 1408 concentrate the images on both eyes of the person wearing the HMD 1400. In other embodiments, the left-eye display 1406 and the right-eye display 1408 may each include a second light valve array, as described above with reference to FIG. 8, in order to create viewing experiences with eye accommodation. In other embodiments, the person wearing the HMD 1400 may wear a bionic contact lens, as described above with reference to FIG. 9, in order to create viewing experiences with eye accommodation.

It is appreciated that the description of the disclosed embodiments herein is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A display comprising:
    a plate light guide having a diffraction grating at a surface of the plate light guide, the diffraction grating having curved diffractive features configured to diffractively couple light out of the plate light guide and to concentrate light coupled out of the plate light guide into an eyebox; and
    a first light valve array oriented substantially parallel to the plate light guide and positioned so that the light coupled out of the plate light guide passes through the first light valve array to form an image in the eyebox.

2. The display of claim 1, wherein the curved diffractive features comprise alternating concentric curved ridges and grooves that share a common center located a distance from an edge of the plate light guide.

3. The display of claim 1, wherein the curved diffractive features have a hyperbolic-shaped curve.

4. The display of claim 3, wherein the curved diffractive features comprise concentric hyperbolic-shaped curved diffractive features.

5. The display of claim 1, further comprising a light source configured to provide light, the provided light being coupled into the plate light guide along an edge.

6. The display of claim 1, wherein a feature spacing of the curved diffractive features decreases with increasing distance from an edge of the plate light guide along which light is coupled into the plate light guide.

7. The display of claim 1, wherein the diffraction grating causes light trapped within the plate light guide to diffract and couple first order diffracted light out of the plate light guide and concentrate the first order diffracted light in the eyebox.

8. The display of claim 1, further comprising a second light valve array oriented substantially parallel to the plate light guide and positioned so that light that emerges from the first light valve array passes through the second light valve array.

9. The display of claim 1, further comprising a pixelated contact lens configured to be worn on a viewer's eye, wherein the pixelated contact lens comprises a plurality of individually operated pixels that control an amount of light that enters the viewer's eye when the viewer's eye is located in the eyebox.

10. The display of claim 1, wherein the diffraction grating comprises a plurality of two-dimensional diffraction grating segments configured to concentrate the light coupled out of the plate light guide into the eyebox.

11. A method to display an image, the method comprising:
    coupling light into a plate light guide, the light being generated by a light source;
    diffractively coupling out a portion of the light from the plate light guide through a diffraction grating at a surface of the plate light guide, the diffraction grating concentrating the diffractively coupled-out light portion into an eyebox; and
    modulating the diffractively coupled-out light portion using a first light valve array oriented substantially parallel to the plate light guide to form viewable images within the eyebox.

12. The method of claim 11, wherein the diffraction grating comprise curved diffractive features having a feature spacing that decreases with increasing distance from an edge of the plate light guide along which the light is coupled into the plate light guide.

13. A head-mounted display comprising:
    a plate light guide having a diffraction grating configured to diffractively couple out a portion of light input to the plate light guide and concentrate light coupled out of the plate light guide into an eyebox;
    a first light valve array oriented substantially parallel to the plate light guide and positioned so that the light coupled out of the plate light guide passes through the first light valve array; and
    a display control connected to the first light valve array, the display control operating the first light valve array to form an image in the eyebox.

14. The head-mounted display of claim 13, wherein the diffraction grating comprise curved diffractive features at a surface of the plate light guide.

15. The head-mounted display of claim 14, wherein the curved diffractive features are concentric hyperbolic-shaped curved diffractive features.

16. The head-mounted display of claim 14, wherein the curved diffractive features comprise alternating curved ridges and grooves that share a common center located a distance from an edge of the plate light guide along which the light is input to the plate light guide.

17. The head-mounted display of claim 13, wherein the diffraction grating comprises curved diffractive features having a feature spacing that decreases with increasing distance from an edge of the plate light guide along which light is coupled into the plate light guide from a light source.

18. The head-mounted display of claim 13, wherein the diffraction grating is configured to cause light trapped within the plate light guide to diffract and couple first order diffracted light out of the plate light guide and to concentrate the first order diffracted light in the eyebox.

19. The head-mounted display of claim 13 further comprising a second light valve array oriented substantially parallel to the plate light guide and positioned so that light that emerges from the first light valve array passes through the second light valve array.

20. The head-mounted display of claim 13 further comprising a pixelated contact lens configured to be worn on a viewer's eye, wherein the pixelated contact lens comprises a plurality of individually operated pixels that control an amount of light that enters the viewer's eye when the viewer's eye is located in the eyebox.

* * * * *